United States Patent [19]

Renner

[11] 4,010,132
[45] Mar. 1, 1977

[54] PROCESS FOR THE MANUFACTURE OF UREA-FORMALDEHYDE CONDENSATION POLYMERS CONTAINING SULPHO GROUPS

[75] Inventor: Alfred Renner, Munchenstein, Switzerland

[73] Assignee: Ciba-Geigy AG, Basel, Switzerland

[22] Filed: May 12, 1975

[21] Appl. No.: 576,938

[30] Foreign Application Priority Data

June 7, 1974 Switzerland ............... 7809/74

[52] U.S. Cl. ............... 260/29.4 R; 260/51.5; 260/70 R; 260/840; 260/849
[51] Int. Cl.² ............... C08L 61/24; C08L 61/34
[58] Field of Search ............ 260/849, 70 R, 29.4 R

[56] References Cited

UNITED STATES PATENTS 3,553,115  1/1971  Curchod et al. ............... 260/3

FOREIGN PATENTS OR APPLICATIONS 315,493  9/1973  Austria
1,907,914  10/1969  Germany
1,318,244  5/1973  United Kingdom

OTHER PUBLICATIONS

Renner, *Die Makromolekulare Chemie*, 149 (1971), 1–27.

*Primary Examiner*—Murray Tillman
*Assistant Examiner*—W. C. Danison, Jr.
*Attorney, Agent, or Firm*—Wenderoth, Lind & Ponack

[57] ABSTRACT

The invention relates to the manufacture of urea-formaldehyde condensation polymers containing sulpho groups. The starting material is a urea-formaldehyde precondensate, and a condensation polymer of naphthalenesulphonic acid and formaldehyde is used as the acid catalyst for the subsequent polycondensation of the urea-formaldehyde precondensate. The peculiarity of this polycondensation is that the condensation catalyst is incorporated into the polymer structure of the UF polymer.

The products obtained according to the invention are distinguished by improved surface affinity coupled with interparticle porosity. They can be used as fillers, as adsorbents, as carriers and as thickeners.

11 Claims, No Drawings

PROCESS FOR THE MANUFACTURE OF UREA-FORMALDEHYDE CONDENSATION POLYMERS CONTAINING SULPHO GROUPS

Several processes for the manufacture of highly disperse urea-formaldehyde polycondensation products of large specific surface area have already been disclosed. In this context reference may be made, for example, to a publication by A. Renner "Kondensationspolymere aus Harnstoff und Formaldehyd mit grosser spezifischer Oberflache" ("Condensation Polymers of Urea and Formaldehyde, having a large specific surface area") in "Die makromolekulare Chemie" 149 (1971) 1-27. Further communications on the manufacture of urea-formaldehyde condensation polymers are to be found in the reference book "Methoden der organischen Chemie" ("Methods of Organic Chemistry") (Houben-Weyl); Makromolekulare Stoffe (Macromolecular Substances), part 2, 320 et seq. (Page 316 of this volume also mentions the condensation of formaldehyde with sulphonated naphthalene, to give soluble products). The following specifications may be mentioned as relevant patents and patent applications: U.S. Pat. No. 3,553,115; German Auslegeschrift 1,907,914, Austrian Pat. No. 315,493 and British Pat. No. 1,318,244.

In these known processes for the manufacture of ureaformaldehyde polycondensation products, the starting materials are either the monomeric components urea (U) and formaldehyde (F), or UF precondensates. The polycondensation is carried out in aqueous solution in the presence of acid catalysts.

Usable polymers are obtained, for example, by employing sulphamic acid or a water-soluble ammonium bisulphate as the catalyst. However, using the process for the manufacture of UF polycondensation products according to the state of the art, highly disperse substances are obtained, which do not possess the optimum properties inherently desired in connection with certain applications. Thus, many of these products do not adequately exhibit certain surface affinity properties which result in particularly good bonds in rubber mixtures, or bonds to certain dyestuffs. Some of the UF polycondensation products manufactured in accordance with these known processes can admittedly be used readily as active fillers for rubber, but the ability of these materials to absorb oil or active compounds is limited. Furthermore, the manufacture of pellets or granules of these UF polycondensation products is rather expensive and difficult, since the material tends to crumble. The known processes for the manufacture of such UF polymers furthermore still require improvement in respect of the fact that the acid catalyst must be removed from the end product by laborious washing.

It is the object of the invention to provide modified urea-formaldehyde polycondensation products with improved properties. The products should as far as possible not exhibit the abovementioned disadvantages with respect to surface affinity and absorbency. It is a further object of the invention so to design the process of manufacture of such polymers that the laborious washing-out of the acid condensation catalyst is unnecessary.

The object of the invention has been achieved by using a urea-formaldehyde precondensate as the starting material and employing, as the acid catalyst for the polycondensation of this precondensate, a condensation polymer of naphthalenesulphonic acid and formaldehyde. The peculiarity of the solution of the invention is that this condensation catalyst is incorporated into the chain molecule of the UF polymer.

Accordingly, the subject of the invention is a process for the manufacture of highly disperse, solid urea-formaldehyde condensation products which are modified by sulpho groups and consist of compact, spherical, agglomerated primary particles of diameter less than 1 $\mu$m, which is characterised in that a precondensate (P) of urea and formaldehyde and a condensation polymer (N) of naphthalenesulphonic acid and formaldehyde are polycondensed in aqueous solution at temperatures of 20 to 100° C to form a gel, the components being used in such ratio that the molar ratio of formaldehyde to urea in the reaction mixture at the moment of gelling is 1.25 to 2, these molar ratios taking into account both the free starting products (formaldehyde and urea) and the monomeric starting products chemically bound in the intermediate products, and that the resulting gel is optionally comminuted, suspended, optionally neutralised, filtered off and dried, and the product thus obtained is optionally deagglomerated by means of a mill or worked up into granules by a build-up granulation process, preferably by extrusion.

According to the process of the invention, the condensation polymer (N) should preferably be present in the reaction mixture in such amount as to provide 10 to 150 milliequivalents of the group —$SO_3H$ per mol of urea. In general, particularly advantageous results are obtained with 20 to 50 milliequivalents of the group —$SO_3H$ per mol of urea. This procedure therefore represents a particularly preferred form of the invention.

The concentration of the aqueous reaction mixture, with respect to the sum of the precondensate (P) and the condensation polymer (N), should preferably be 15 to 40% by weight (based on the solution). Particularly good polymers are obtained with a concentration of 20 to 25% by weight.

The precondensates (P) are manufactured in accordance with known processes by condensation of F and U in aqueous solution. According to the invention, precondensates (P) which contain F and U in the molar ratio of 1.3 to 1.8, and precondensates which have been manufactured by precondensation of the reactants in the pH range of 6 to 9 and in the temperature range of 20° to 100° C, are employed.

The condensation polymer (N) should preferably contain the components in such ratios as to provide 0.7 to 2.2 mols of formaldehyde per mol of naphthalenesulphonic acid. The best results are obtained if the molar ratio of F to naphthalenesulphonic acid is 1.0 to 1.5.

The condensation polymer (N) is manufactured in accordance with known processes by condensation of naphthalenesulphonic acid with formaldehyde in aqueous solution. In general, technical naphthalenesulphonic acid which, as is known, predominantly contains the 2-sulphonic acid, and also a little free sulphuric acid, is employed. The naphthalenesulphonic acid can also be manufactured in situ during the manufacture of the condensation polymer (N).

The polycondensation according to the invention can also be carried out in such a way that comonomers partially replace urea (namely in up to ⅓ of the molar amount), that is to say that such comonomers are also incorporated into the chain molecule. These comonomers are substances which, like urea, can form polycondensates with formaldehyde or methylol compounds. The following substances may be mentioned individually: phenol, resorcinol, alkylphenols (such as the cresols), aniline, benzoguanamine, acid amides (such as formamide, acrylamide, dicyandiamide and oxalic acid diamide), salicylic acid, biuret and hydantoins (such as, for example, 5,5-dimethylhydantoin). Mixtures of individual substances of this type can also be used as comonomers.

The comonomers can be incorporated in two ways. Either a precondensate (P), in which up to ⅓ of the amount of urea inherently envisaged is replaced by a corresponding molar amount of comonomer, is employed, or a precondensate (P) with a correspondingly lower urea content (up to ⅓ lower than that inherently envisaged) is employed and the requisite amount of the particular comonomer is added to the reaction mixture, containing the precondensate (P) and the condensation polymer (N), before or during the polycondensation.

The products manufactured by the process according to the invention show strong hydrogen bridge bonds and are therefore not soluble in customary organic solvents. On the other hand, they are soluble in hot formic acid and in saturated aqueous solutions of lithium bromide and magnesium perchlorate. They can be reprecipitated from these solutions. They melt around 250° C, with evolution of formaldehyde.

The products manufactured according to the invention can be used as reinforcing fillers for elastomers, as adsorbents for sewage purification, particularly for breaking spent oil emulsions, as carriers for active compounds in agricultural chemistry, and as thickeners and solidifying agents for lacquers, printing inks, liquid feedstuffs and the like. They are particularly effective when used for this purpose, because of their improved surface affinity coupled with interparticle porosity.

The products obtainable by using the process according to the invention can be converted surprisingly advantageously into pellets or granules. The known processes for build-up granulation such as, for example, tableting, extrusion or build-up by means of a granulating disc, can be used for this purpose. In contrast to known UF polycondensates, the products manufactured according to the invention show astonishingly little tendency to crumble.

The successful solution of the object of the invention was surprising if previous experience with condensation catalysts containing sulpho groups is taken into account. In fact, using the known processes for the manufacture of UF polycondensation products employing sulphamic acid or water-soluble ammonium bisulphates as catalysts it has never proved possible to build these catalysts into the molecule of the condensation polymer.

A further surprising feature of the process according to the invention is that to achieve the large surface area and good properties of the end products it is, in contrast to other known UF polycondensation processes, not necessary to add surface-active substances or protective colloids. Admittedly this does not mean that such addition has an adverse effect on the process according to the invention. There may be cases in which an addition of such substances is desirable, for example for technological reasons.

A further subject of the invention are highly disperse solid urea-formaldehyde polycondensation products which are modified by sulpho groups and consist of compact, spherical, agglomerated primary particles of diameter less than 1 $\mu m$, and which are manufactured in accordance with the process of the invention. The UF polycondensation products according to the invention preferably have a specific surface area of 5 to 100 $m^2/g$, a sulphur content of 0.2 to 2% by weight and an average diameter of the primary particles of 0.04 to 1 $\mu m$. The UF polycondensation products according to the invention can contain a comonomer as a partial replacement for urea, the molar ratio of comonomer to urea being up to ½.

In the examples which follow, parts denote parts by weight and percentages denote percentages by weight.

EXAMPLES

A) Manufacture of the condensation polymers (N)

a. Condensation polymer (N) - A

Naphthalene : $H_2SO_4$ : formaldehyde = 1:1:1 (molar ratio)

128 parts of naphthalene and 100 parts of concentrated sulphuric acid are heated for 6 hours to 160° C, whilst stirring. The mixture is cooled to 100° C and 100 parts of an aqueous 30% strength formaldehyde solution are added dropwise. The temperature is kept at 100° C by the heat of reaction which is liberated. After boiling for 30 minutes under reflux, the mixture is diluted with 100 parts of water. After a further 16 hours' boiling under reflux, a formaldehyde conversion of 94.5% is reached. The mixture is diluted with a further 100 parts of water and 510 parts of a brown, viscous solution having a solids content of 45.5% and an acid content of 2.17 equivalents/kg are obtained. The acid resin solution can be diluted with water in any desired ratio.

b. Condensation polymer (N) - B

Naphthalene : $H_2SO_4$ : formaldehyde = 1:1:1.5

128 parts of naphthalene are sulphonated with 100 parts of concentrated sulphuric acid for 6 hours at 160° C and then condensed with 150 parts of aqueous 30% strength formaldehyde solution at 100°-110° C. The mixture was diluted, and the conversion determined, after the times shown.

| Hours at 100–110° C | Addition of parts of $H_2O$ | $CH_2O$ conversion (%) |
|---|---|---|
| 12.5 | 40 | — |
| 17.0 | — | 79.6 |
| 19.5 | 60 | — |
| 23.5 | — | 81.7 |
| 24.0 | 100 | — |
| 40.0 | — | 85 |
| 48.0 | — | 85.2 |

After cooling, 512 parts of a viscous brown resin are obtained, which is miscible with water in any desired ratio and gives colloidal solutions. The resin has a solids content of 44.5% and an acid content of 2.12 equivalents/kg.

c. Condensation polymer (N) - C $C_{10}H_8$ : $H_2SO_4$ : $CH_2O$ = 1:1:2

Following the procedure described in the preceding examples, 128 parts of naphthalene are sulphonated with 100 parts of concentrated sulphuric acid and then condensed with 200 parts of 30% strength aqueous formaldehyde solution for 22 hours at 100° C and diluted with 100 parts of water. Thereafter, the conversion of the formaldehyde is 76.6%. 472 parts of a resin which is almost solid but is miscible with water in any desired ratio and gives colloidal solutions, are obtained. The solids content is 50% and the acid content is 2.09 equivalents/kg.

d. Condensation polymer (N) - D $C_{10}H_8 : H_2SO_4 : CH_2O = 1:1:0.75$ 128 parts of naphthalene are sulphonated with 100 parts of concentrated sulphuric acid for 6 hours at 160° C and then condensed with 75 parts of 30% strength aqueous formaldehyde solution for 29 hours at 110° – 120° C. Towards the end of this reaction time, the mixture was diluted twice with 100 parts of water.

| Yield | 475 parts |
|---|---|
| Solids content | 45% |
| Acid content | 2.2 equivalents/kg |
| Dilutability with $H_2O$ | ∞ | e. Condensation polymer (N) - E $C_{10}H_8 : H_2SO_4 : CH_2O = 1:1.4:1.1$ 128 parts of naphthalene are sulphonated with 110 parts of concentrated sulphuric acid for 6 hours at 160° C and condensed with 110 parts of 30% strength aqueous formaldehyde solution at 100° – 110° C. After the reaction times shown, the mixture was diluted as shown and the formaldehyde conversions shown were determined:

| Hours at 100–110° C | Addition of parts of $H_2O$ | $CH_2O$ conversion (%) |
|---|---|---|
| 3 | 100 | — |
| 26.5 | — | 81.8 |
| 30 | 100 | — |
| 45 | — | 87.5 |
| 72 | — | 90.9 |
| 78 | 50 | 90.9 |

| Yield | 570 parts |
|---|---|
| Solids content | 43% |
| Acid content | 2.16 equivalents/kg |
| Dilutability with $H_2O$ | ∞ | f. Condensation polymer (N) - F

Naphthalenesulphonic acid : $CH_2O = 1$ (molar ratio).

343.8 parts of technical naphthalenesulphonic acid (predominantly the 2-acid, 5.82 equivalents of —$SO_3H$/kg) and 200 parts of 30% strength aqueous formaldehyde solution are condensed at 100° C.

| Hours at 100–102° C | addition of parts of $H_2O$ | $CH_2O$ conversion (%) |
|---|---|---|
| 5 | 100 | — |
| 21.5 | — | 56 |
| 22.0 | — | 76.3 |
| 23.0 | 34 | — |
| 41.0 | 100 | — |
| 46.0 | — | 78.3 |
| 53.0 | — | 79.8 |
| 68.0 | 10 | 80.0 |

| Yield | 877 parts |
|---|---|
| Solids content | 42.5% |
| Acid content | 2.255 equivalents/kg |
| Dilutability with $H_2O$ | ∞ | g. Condensation polymer (N) - G

Naphthalenesulphonic acid : $CH_2O = 1.5$ (molar ratio).

343.8 parts of technical naphthalenesulphonic acid (predominantly the 2-acid, 5.82 equivalents of —$SO_3H$/kg) and 300 parts of 30% strength aqueous formaldehyde solution are condensed at 100° C.

| Hours at 100° C | Addition of parts of $H_2O$ | $CH_2O$ conversion (%) |
|---|---|---|
| 4.5 | 100 | — |
| 21.5 | — | 55.8 |
| 42.0 | — | 66.7 |
| 64.0 | 10 | 74.4 |

| Yield | 686 parts |
|---|---|
| Solids content | 57.2% |
| Acid content | 3.00 equivalents/kg |
| Dilutability with $H_2O$ | ∞ |

B) MANUFACTURE OF THE UREA-FORMALDEHYDE POLYCONDENSATION PRODUCTS

EXAMPLES 1 – 3

900 parts of urea are dissolved in 2,100 parts of water, the solution is warmed to 70° C, 2,250 parts of 30% strength aqueous formaldehyde solution are added, condensation is carried out for 30 minutes at pH 7 and 70° C, and the mixture is cooled to 50° C. This precondensate is divided into 3 equal parts which are mixed with solutions of the condensation polymer (N)-B at 50° C, and converted into polymer gels, in accordance with the conditions indicated below.

| Example No. | 1 | 2 | 3 |
|---|---|---|---|
| Parts of condensation polymer (N)-B | 47.2 | 53.1 | 59.1 |
| dissolved in parts of $H_2O$ | 303 | 530 | 815 |
| gelling concentration (% by weight of U + F) | 25 | 22.5 | 20 |
| milliequivalents of $SO_3H$/mol of urea | 20 | 22.5 | 25 |
| gelling time (sec.) | 25 | 27 | 29 |
| gelling pH | 2.1 | 2.1 | 2.1 |
| temperature rise to ° C: | 65 | 64 | 63 |

Each gel is kept at 65° C for 2 hours, comminuted, stirred thoroughly with 2,000 parts of water and adjusted to pH 7.5 with 2 N NaOH. The polymers are filtered off, dried overnight in a stream of air at 110° C and deagglomerated by passing them through an air jet mill with an input pressure of 40 atmospheres. Very bulky white polymer powders are obtained.

| Example No. | 1 | 2 | 3 |
|---|---|---|---|
| Yield (parts) | 400 | 404 | 401 |
| specific surface area (m²/g) | 67.8 | 80.8 | 78.8 |
| average diameter of the primary particles (A) | 600 | 510 | 520 |
| agglomerates (μm) | 3.7 | 3.8 | 4.4 |
| residual moisture (%) | 5.6 | 5.8 | 5.4 |
| bulk density (g/l) | 124 | 100 | 125 |
| oil absorbency (% DBP) | 200 | 228 | 174 |
| sulphur content (%) | 0.4 | 0.7 | 0.9 |

(The oil absorbency was determined by the method of Wolff and Toeldte).

EXAMPLES 4 – 6

The same precondensate as in Examples 1 – 3 is prepared and divided into 3 equal parts; these are mixed, at 50° C, with the amounts of the condensation polymer (N)-A indicated below, and the mixtures are converted into polymer gels.

| Example No. | 4 | 5 | 6 |
|---|---|---|---|
| parts of condensation polymer (N)-A | 46.2 | 52.0 | 58.0 |
| dissolved in parts of H₂O | 300 | 530 | 820 |
| gelling concentration (% by weight of U + F) | 25 | 22.5 | 20 |
| milliequivalents of SO₃H/mol of urea | 20 | 22.5 | 25 |
| gelling time (sec.) | 20 | 22 | 25 |
| gelling pH | 2.0 | 2.0 | 2.0 |

After comminution, each gel is stirred with 2,500 parts of water but is otherwise treated like the gels in Examples 1 – 3.

| Example No. | 4 | 5 | 6 |
|---|---|---|---|
| Yield (parts) | 393 | 393 | 396 |
| specific surface area (m²/g) | 58.1 | 85.6 | 62.5 |
| average diameter of the primary particles (A) | 660 | 480 | 660 |
| agglomerates (μm) | 3.8 | 3.4 | 3.0 |
| residual moisture (%) | 3.5 | 3.6 | 3.6 |
| bulk density (g/l) | 39.6 | 33.0 | 24.0 |
| oil absorbency (% DBP) | 371 | 391 | 424 |
| sulphur content (%) | 0.7 | 0.7 | 0.85 |

| Example 7 | |
|---|---|
| Precondensate: | |
| Urea | 180 parts |
| formaldehyde (30%) | 450 parts |
| deionised water | 300 parts |
| 30 minutes at pH 7.0 and 70° C | |
| condensation polymer (N)-C | 28.7 parts |
| dissolved in H₂O | 300 parts |
| gelling concentration (%) | 25 |
| milliequivalents of SO₃H/mol of urea | 20 |
| gelling time (sec.) | 18 |
| temperature variation (° C) | 50 → 65 |
| gelling pH | 2.1 |
| parts of H₂O used to work up the gel | 1500 |
| further working up as in Examples | 1 – 3 |
| yield (parts) | 237 |
| specific surface area (m²/g) | 70 |
| average diameter of the primary particles (A) | 590 |
| average diameter of the agglomerates (μm) | 4.3 |
| residual moisture (%) | 2.1 |
| bulk density (g/l) | 130 |
| oil absorbency (% DBP) | 227 |
| sulphur content (%) | 0.7 |

| Example 8 | |
|---|---|
| Urea (parts) | 300 |
| deionised water | 700 |
| formaldehyde, 30% strength | 750 |
| 30 minutes at pH 7 and 70° C | |
| parts of condensation polymer (N)-E | 57.9 |
| dissolved in parts of H₂O | 816 |
| gelling concentration (% U+F) | 20 |
| milliequivalents of SO₃H/mol of urea | 25 |
| gelling time (sec.) | 25 |
| gelling pH | |
| temperature variation, ° C | 50 → 62 |
| parts of H₂O used to work up the gel | 2500 |
| at pH | 7.5 |
| drying and working up as in examples | 1 – 3 |
| yield (parts) | 397 |
| specific surface area (m²/g) | 63.7 |
| average diameter of primary particles (A) | 650 |
| average diameter of agglomerates (μm) | 3.5 |
| residual moisture (%) | 3.5 |
| bulk density (g/l) | 37 |
| oil absorbency (% DBP) | 339 |
| sulphur content (%) | 0.75 |

EXAMPLES 9 to 20

Table 1 shows further examples in which the condensation polymers (N), type F (Examples 9 – 14) and type G (Examples 15 – 20) are employed. Both series of experiments show that the properties of the polycondensates which can be prepared in this way are dependent on the molar ratio of formaldehyde/urea.

EXAMPLES 21 to 31

These examples are shown in Table II. The condensation polymer (N), type G, is employed in various concentrations. The gelling concentration and the catalyst concentration are also varied.

EXAMPLES 32 to 44

These examples are shown in Table III and relate to the manufacture of the urea-formaldehyde polycondensation products according to the invention in the presence of various comonomers. According to Examples 39 to 44, the particular comonomer is essentially built into the molecule already during the manufacture of the precondensate (P), that is to say the total amount of comonomer is already present in the reaction mixture during the precondensation (P).

According to Examples 32 to 38, in contrast to the above method, the comonomer is only added to the reaction mixture for the final polycondensation after the manufacture of the precondensate (P) and of the condensation polymer (N). Here, therefore, the comonomer is only built into the polycondensate in the final stage.

Table I

| Example No. | 9 | 10 | 11 | 12 | 13 | 14 |
|---|---|---|---|---|---|---|
| parts of urea | 300 | 300 | 300 | 300 | 300 | 300 |
| parts of $H_2O$ | 600 | 600 | 600 | 600 | 600 | 600 |
| parts of 30% strength formaldehyde | 650 | 700 | 750 | 800 | 850 | 900 |
| $CH_2O$/urea | 1.3 | 1.4 | 1.5 | 1.6 | 1.7 | 1.8 |
| precondensation | 30 minutes at pH 7 and 70° C | | | | | |
| condensation polymer (N) - type | F | F | F | F | F | F |
| parts | 55.3 | 55.3 | 55.3 | 55.3 | 55.3 | 55.3 |
| dissolved in parts of $H_2O$ | 870 | 895 | 920 | 945 | 970 | 995 |
| gelling concentration (% by weight) | 20.0 | 20.0 | 20.0 | 20.0 | 20.0 | 20.0 |
| milliequivalents of condensation polymer (N) per mol of urea | 25.0 | 25.0 | 25.0 | 25.0 | 25.0 | 25.0 |
| gelling time (sec.) | 22 | 20 | 24 | 29 | 31 | 44 |
| gelling pH temperature rise from 50 to ° C | 62 | 63 | 62 | 62 | 59 | 57 |
| working up of the polymer as in | Examples 1 - 3 | | | | | |
| yield (parts) | 370 | 382 | 360 | 399 | 403 | 393 |
| specific surface area ($m^2/g$) | 39.7 | 59.3 | 64.7 | 77.9 | 78.8 | 44.9 |
| d of the primary particles (A) | 1040 | 720 | 660 | 530 | 525 | 920 |
| d of the agglomerates ($\mu m$) | 3.4 | 4.9 | 3.7 | 4.7 | 5.3 | 4.4 |
| residual moisture (%) | 3.6 | 3.5 | 4.0 | 3.8 | 4.2 | 3.8 |
| bulk density (g/l) | 80 | 50 | 50 | 78 | 150 | 250 |
| oil absorbency (% DBP) | 202 | 309 | 292 | 234 | 195 | 101 |
| sulphur content (%) | 0.75 | 0.95 | 0.8 | 0.75 | 0.7 | 0.75 |
| methylol group content (%) | 0.06 | 0.57 | 0.86 | 2.06 | 2.29 | 2.98 |
| Example No. | 15 | 16 | 17 | 18 | 19 | 20 |
| parts of urea | 300 | 300 | 300 | 300 | 300 | 300 |
| parts of $H_2O$ | 600 | 600 | 600 | 600 | 600 | 600 |
| parts of 30% strength formaldehyde | 650 | 700 | 750 | 800 | 850 | 900 |
| $CH_2O$/urea | 1.3 | 1.4 | 1.5 | 1.6 | 1.7 | 1.8 |
| precondensation | 30 minutes at pH 7 and 70° C | | | | | |
| condensation polymer (N) - type | G | G | G | G | G | G |
| parts | 37.5 | 37.5 | 37.5 | 37.5 | 37.5 | 37.5 |
| dissolved in parts of $H_2O$ | 612.5 | 627.5 | 645.5 | 662.5 | 677.5 | 694.5 |
| gelling concentration (% by weight) | 22.5 | 22.5 | 22.5 | 22.5 | 22.5 | 22.5 |
| milliequivalents of condensation polymer (N) per mol of urea | 22.5 | 22.5 | 22.5 | 22.5 | 22.5 | 22.5 |
| gelling time (sec.) | 19 | 20 | 22 | 23 | 28 | 37.5 |
| gelling pH temperature rise from 50 to ° C | 64 | 60 | 65 | 64 | 60 | 60 |
| working up of the polymer as in | Examples 1 - 3 | | | | | |
| yield (parts) | 369 | 391 | 390 | 388 | 402 | 391 |
| specific surface area ($m^2/g$) | 36.0 | 49.5 | 64.3 | 76.4 | 85.9 | 44.9 |
| d of the primary particles (A) | 1180 | 830 | 640 | 540 | 480 | 920 |
| d of the agglomerates ($\mu m$) | 3.5 | 4.3 | 4.9 | 4.7 | 3.9 | 6.6 |
| residual moisture (%) | 4.1 | 3.1 | 3.3 | 4.6 | 5.3 | 3.1 |
| bulk density (g/l) | 42 | 39 | 44 | 60 | 73 | 250 |
| oil absorbency (% DBP) | 338 | 418 | 405 | 330 | 278 | 103 |
| sulphur content (%) | 0.95 | 0.75 | 0.80 | 0.70 | 0.70 | 0.70 |
| methylol group content (%) | 0.06 | 0.09 | 1.36 | 2.06 | 1.72 | 3.15 |

Table II

Various gelling concentrations and amounts of catalyst at F/U = 1.7

| Example No. | 21 | 22 | 23 | 24 | 25 |
|---|---|---|---|---|---|
| parts of urea | 180 | 180 | 180 | 180 | 180 |
| parts of $H_2O$ | 500 | 500 | 500 | 500 | 150 |
| parts of 30% strength formaldehyde | 510 | 510 | 510 | 510 | 510 |
| precondensation | 30 minutes at pH 7 and 70° C | | | | |
| parts of condensation polymer (N)-G | 33.3 | 29.0 | 25.0 | 22.5 | 20.0 |
| dissolved in parts of $H_2O$ (% by weight) | 998 | 685 | 450 | 270 | 472 |
| gelling concentration (% by weight) | 15.0 | 17.5 | 20.0 | 22.5 | 25.0 |
| milliequivalents of condensation polymer (N) per mol of urea | 33.3 | 28.6 | 25.0 | 22.5 | 20.0 |
| gelling time (sec.) | 50.0 | 44 | 38 | 36 | 33 |
| temperature rise from 50 to ° C | 58 | 58 | 61 | 61 | 63 |
| yield (parts) | 223 | 224 | 230 | 230 | 238 |
| specific surface area ($m^2/g$) | 53.9 | 68.9 | 78.6 | 76.6 | 74.8 |
| residual moisture (%) | 4.2 | 4.8 | 4.3 | 4.3 | 3.5 |
| bulk density (g/l) | 280 | 230 | 133 | 122 | 90 |
| oil absorbency (% DBP) | 99 | 121 | 203 | 233 | 319 |
| methylol group content (%) | 2.52 | — | 2.36 | — | 2.04 |

| Example No. | 26 | 27 | 28 | 29 | 30 | 31 |
|---|---|---|---|---|---|---|
| parts of urea | 180 | 180 | 180 | 180 | 180 | 180 |
| parts of $H_2O$ | 150 | 150 | 150 | — | — | — |
| parts of 30% strength formaldehyde | 510 | 510 | 510 | 510 | 510 | 510 |
| precondensation | 30 minutes at pH 7 and 70° C | | | | | |
| parts of condensation polymer (N)-G | 18.5 | 17.0 | 15.5 | 14.3 | 13.4 | 12.5 |
| dissolved in parts of $H_2O$ (% by weight) | 355 | 260 | 170 | 248 | 185 | 130 |
| gelling concentration (% by weight) | 27.5 | 30.0 | 32.5 | 35 | 37.5 | 40.0 |
| milliequivalents of condensation polymer (N) per mol of urea | 18.2 | 16.7 | 15.4 | 14.3 | 13.3 | 12.5 |
| gelling time (sec.) | 28 | 25 | 26 | 23 | 21 | 19 |
| temperature rise from 50 to ° C | 65 | 66 | 67 | 67 | 69 | 70 |
| yield (parts) | 240 | 242 | 237 | 216 | 228 | 235 |
| specific surface area ($m^2/g$) | 70.4 | 69.4 | 66.2 | 64.4 | 65.2 | 62.7 |
| residual moisture (%) | 5.8 | 5.1 | 4.7 | 3.1 | 3.3 | 3.1 |
| bulk density (g/l) | 80 | 89 | 88 | 101 | 94 | 105 |
| oil absorbency (% DBP) | 379 | 399 | 409 | 336 | 350 | 353 |
| methylol group content (%) | — | 2.61 | 2.30 | 3.09 | 3.32 | 3.25 |

Table III

Additional use of condensation comonomers

| Example No. | 32 | 33 | 34 | 35 |
|---|---|---|---|---|
| parts of urea | 162 | 135 | 162 | 135 |
| parts of $H_2O$ | 421 | 450 | 412 | 486 |
| parts of 30% strength formaldehyde | 510 | 510 | 510 | 510 |
| comonomer, a) type | phenol | phenol | m-cresol | m-cresol |
| b) parts | 28.2 | 70.5 | 32.4 | 81 |
| c) present during precondensation | FPC* | FPC | FPC | FPC |
| minutes at pH 7 and 70° C | 30 | 30 | 30 | 30 |
| parts of condensation polymer (N)-G | 22.5 | 22.5 | 22.5 | 22.5 |
| parts of $H_2O$ | 405 | 405 | 405 | 405 |
| gelling concentration ***(% by weight) | 22.5 | 22.5 | 22.5 | 22.5 |
| milliequivalents of condensation polymer (N) per mol of urea/comonomer | 22.5 | 22.5 | 22.5 | 22.5 |
| gelling time (sec.) | 31 | 47 | 18 | 90 |
| gelling pH | 1.7 | 1.5 | 1.8 | 1.5 |
| temperature rise from 50° C to | 60 | 58 | 61 | 62 |
| yield (parts) | 251 | 260 | 254 | 259 |
| specific surface area ($m^2/g$) | 67.9 | 45.8 | 35.7 | 29.3 |
| residual moisture (%) | 3.6 | 2.6 | 3.6 | 3.6 |
| bulk density (g/l) | 86 | 53 | 49 | 86 |
| Oil absorbency (% DBP) | 446 | 313 | 496 | 294 |

Table III-continued

| Example No. | Additional use of condensation comonomers | | | |
|---|---|---|---|---|
| | 36 | 37 | 38 | 39 |
| parts of urea | 162 | 135 | 162 | 180 |
| parts of H₂O | 414 | 510 | 443 | 408 |
| parts of 30% strength formaldehyde | 510 | 510 | 510 | 510 |
| comonomer, a) type | resorcinol | resorcinol | salicylic acid | formamide |
| b) parts | 33 | 82.5 | 41.4 | 13.5 |
| c) present during precondensation, | FPC* | FPC | FPC | UF-PC** |
| minutes at pH 7 and 70° C | 30 | 30 | 30 | 120 |
| parts of condensation polymer (N)-G | 22.5 | 22.5 | 22.5 | 24.8 |
| parts of H₂O | 405 | 405 | 405 | 405 |
| gelling concentration*** (% by weight) | 22.5 | 22.5 | 22.5 | 22.5 |
| milliequivalents of condensation polymer (N) per mol of urea/comonomer | 22.5 | 22.5 | 22.5 | 22.5 |
| gelling time (sec.) | 7 | 5 | 32 | 31 |
| gelling pH | 1.8 | 1.5 | 1.5 | 1.5 |
| temperature rise from 50° C to | 65 | 71 | 58 | 61 |
| yield (parts) | 248 | 277 | 237 | 239 |
| specific surface area (m²/g) | 58.1 | 26.2 | 50.3 | 73.6 |
| residual moisture (%) | 2.0 | 3.2 | 3.1 | 2.6 |
| bulk density (g/l) | 51 | 44 | 197 | 176 |
| oil absorbency (% DBP) | 520 | 551 | 158 | 168 |

| Example No. | 40 | 41 | 42 | 43 | 44 |
|---|---|---|---|---|---|
| parts of urea | 180 | 135 | 300 | 135 | 162 |
| parts of H₂O | 474 | 434 | 600 | 472 | 433 |
| parts of 30% strength formaldehyde | 510 | 510 | 700 | 510 | 510 |
| comonomer, a) type | formamide | oxalic acid diamide | acrylamide | biuret | 5,5-dimethyl-hydantoin |
| b) parts | 33.8 | 66 | 35.5 | 77.3 | 38.4 |
| c) present during precondensation, | UF-PC** | UF-PC | UF-PC | UF-PC | UF-PC |
| minutes at pH 7 and 70° C | 120 | 120 | 120 | 120 | 120 |
| parts of condensation polymer (N)-G | 28.1 | 22.5 | 41 | 22.5 | 22.5 |
| parts of H₂O | 405 | 405 | 625 | 405 | 405 |
| gelling concentration*** (% by weight) | 22.5 | 22.5 | 22.5 | 22.5 | 22.5 |
| milliequivalents of condensation polymer (N) per mol of urea/comonomer | 22.5 | 22.5 | 22.5 | 22.5 | 22.5 |
| gelling time (sec.) | 37 | 32 | 26 | 102 | 53 |
| gelling pH | 1.6 | — | 1.5 | — | — |
| temperature rise from 50° C to | 61 | 55 | 60 | 58 | 58 |
| yield (parts) | 247 | 244 | | 250 | 227 |
| specific surface area (m²/g) | 56.2 | 49.4 | 47.4 | 44.9 | 70.6 |
| residual moisture (%) | 3.7 | 3.2 | 1.8 | 2.1 | 3.5 |
| bulk density (g/l) | 203 | 215 | | 320 | 207 |
| oil absorbency (% DBP) | 137.5 | 149 | | 102 | 131.2 |

*FPC = final polycondensation
** UF-PC = urea-formaldehyde precondensation
*** urea/formaldehyde/comonomer

I claim:

1. In a process for the manufacture of urea-formaldehyde condensation products the improvement according to which highly disperse, solid urea-formaldehyde condensation products are formed which contain sulpho groups and consist of compact, spherical, agglomerated primary particles having a diameter of less than 1 μm, the process comprising polycondensing a precondensate (P) of urea and formaldehyde and a condensation polymer (N) of naphthalenesulphonic acid and formaldehyde in aqueous solution at temperatures of 20° to 100° C to form a gel, the components being added in such ratio that the molar ratio of formaldehyde to urea in the reaction mixture at the moment of gelling is 1.25 to 2, these molar ratios taking into account both the free starting products (formaldehyde and urea) and the monomeric starting products chemically bound in the intermediate products.

2. A process according to claim 1, wherein the polycondensation to give the cross-linked gel is carried out in such a way that 10 to 150 milliequivalents of the condensation polymer (N) are present in the reaction mixture per mol of urea.

3. A process according to claim 2, wherein the polycondensation is carried out in such a way that 20 to 50 milliequivalents of the condensation polymer (N) are present which contains the precondensate (P) are present per mol of urea.

4. A process according to claim 1, wherein the precondensate (P) employed has a molar ratio of formaldehyde to urea of 1.3 to 1.8.

5. A process according to claim 1, wherein the condensation polymer (N) employed has a molar ratio of formaldehyde to naphthalenesulphonic acid of 0.7 to 2.2.

6. A process according to claim 5, wherein the condensation polymer (N) employed has a molar ratio of formaldehyde to naphthalenesulphonic acid of 1.0 to 1.5.

7. A process according to claim 1, wherein an aqueous solution of a precondensate (P) which has been prepared by precondensation of the reactants in the pH range of 6 to 9 and in the temperature range of 20° to 100° C is used.

8. A process according to claim 1, wherein the polycondensation is carried out in an aqueous solution which contains the precondensate (P) and the condensation polymer (N) together in a concentration of 15 to 40% by weight based on the solution.

9. A process according to claim 8, wherein the concentration is from 20 to 25% by weight.

10. Highly disperse solid urea-formaldehyde condensation polymers which contain sulpho groups, consist of compact, spherical, agglomerated primary particles of diameter less than 1 $\mu$m, and are manufactured in accordance with the process of claim 1.

11. Pulverulent urea-formaldehyde condensation polymers according to claim 10, wherein the products have a specific surface area of 5 to 100 m$^2$/g, a sulphur content of 0.2 to 2.0% by weight and an average diameter of the primary particles of 0.04 to 1 $\mu$m.

* * * * *